US012245183B2

United States Patent
Tangudu et al.

(10) Patent No.: US 12,245,183 B2
(45) Date of Patent: Mar. 4, 2025

(54) METHOD AND APPARATUS FOR BINDING A PLURALITY OF SUBSCRIBER IDENTITY MODULES (SIMS) ASSOCIATED WITH A USER EQUIPMENT (UE) TO OPTIMIZE NETWORK RESOURCES

(71) Applicant: Samsung Electronics Co., Ltd., Suwon-si (KR)

(72) Inventors: Narendranath Durga Tangudu, Bangalore (IN); Kundan Tiwari, Bangalore (IN); Lalith Kumar, Bangalore (IN); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 17/631,415

(22) PCT Filed: Jul. 31, 2020

(86) PCT No.: PCT/KR2020/010143
§ 371 (c)(1),
(2) Date: Jan. 28, 2022

(87) PCT Pub. No.: WO2021/020936
PCT Pub. Date: Feb. 4, 2021

(65) Prior Publication Data
US 2022/0279470 A1  Sep. 1, 2022

(30) Foreign Application Priority Data

Aug. 1, 2019  (IN) .............................. 201941031238
Jul. 27, 2020 (IN) .............................. 201941031238

(51) Int. Cl.
*H04W 60/00*   (2009.01)
*H04W 8/18*    (2009.01)
(Continued)

(52) U.S. Cl.
CPC .......... *H04W 60/04* (2013.01); *H04W 8/183* (2013.01); *H04W 12/106* (2021.01);
(Continued)

(58) Field of Classification Search
CPC ..... H04W 8/04; H04W 84/042; H04W 8/183; H04W 8/205; H04W 8/22; H04W 8/24;
(Continued)

(56) References Cited

U.S. PATENT DOCUMENTS 9,445,385 B2 *  9/2016  Nayak ................... H04W 72/56
9,769,867 B2 *  9/2017  Ramkumar ........... H04W 68/02
(Continued)

FOREIGN PATENT DOCUMENTS

WO    2018077243 A1    5/2018
WO    2019079586 A1    4/2019

OTHER PUBLICATIONS

International Search Report and Written Opinion of the International Searching Authority dated Nov. 6, 2020, in connection with International Application No. PCT/KR2020/010143, 8 pages.
(Continued)

*Primary Examiner* — Frank Duong

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Accordingly, the embodiments herein provide a method for binding a plurality of subscriber identity mod-
(Continued)

ules (SIMs) (150) associated with a user equipment (UE) (100) to optimize network resources in a wireless network.

14 Claims, 13 Drawing Sheets

(51) Int. Cl.
*H04W 12/106* (2021.01)
*H04W 12/45* (2021.01)
*H04W 12/50* (2021.01)
*H04W 60/04* (2009.01)
*H04W 84/04* (2009.01)

(52) U.S. Cl.
CPC ........... *H04W 12/45* (2021.01); *H04W 12/50* (2021.01); *H04W 84/042* (2013.01)

(58) Field of Classification Search
CPC ..... H04W 8/26; H04W 12/06; H04W 12/106; H04W 12/40; H04W 12/45; H04W 12/50; H04W 60/00; H04W 60/005; H04W 60/04; H04W 68/02; H04W 76/16; H04W 76/34; H04W 88/02; H04W 88/06
See application file for complete search history.

(56) References Cited

U.S. PATENT DOCUMENTS

| | | | |
|---|---|---|---|
| 10,405,172 | B2 | 9/2019 | Kumar et al. |
| 11,357,067 | B2* | 6/2022 | Nimmala ............ H04W 60/005 |
| 2016/0182110 | A1 | 6/2016 | Selvaraj et al. |
| 2017/0150545 | A1 | 5/2017 | Ramkumar et al. |
| 2017/0318463 | A1 | 11/2017 | Lee et al. |
| 2019/0132726 | A1 | 5/2019 | Song et al. |
| 2019/0261299 | A1 | 8/2019 | Liu et al. |
| 2022/0078742 | A1* | 3/2022 | Tiwari ................ H04W 60/005 |
| 2022/0191696 | A1* | 6/2022 | Yoshizawa ............ H04L 9/3213 |
| 2022/0225093 | A1* | 7/2022 | Sasi ....................... H04W 12/06 |
| 2022/0240213 | A1* | 7/2022 | Ly ......................... H04W 60/04 |
| 2022/0330194 | A1* | 10/2022 | Kumar .................. H04W 68/02 |
| 2023/0093965 | A1* | 3/2023 | Velev .................. H04W 60/005 |
| | | | 455/458 |

OTHER PUBLICATIONS

3GPP TR 22.834 V17.0.0 (Jun. 2019), Technical Report, 3rd Generation Partnership Project; Technical Specification Group Services and System Aspects; Study on Support for Multi-USIM Devices (Release 17), Jun. 2019, 17 pages.

Qualcomm Incorporated, "Use cases for multi-USIM devices," S1-190156 (revision of S1-19xxxx), 3GPP TSG-SA WG1 Meeting #85, Tallinn, Estonia, Feb. 18-22, 2019, 3 pages.

Samsung, "Service Categorization in MUSIM," S1-192009 (revision of S1-192zzz), 3GPP TSG-SA WG1 Meeting #87, Sophia-Antipolis, France, Aug. 19-23, 2019, 3 pages.

Samsung, "'Separate Devices'38 assumption in MUSIM," S1-192011 (revision of S1-192zzz), 3GPP TSG-SA WG1 Meeting #87, Sophia-Antipolis, France, Aug. 19-23, 2019, 2 pages.

Examination report dated Nov. 12, 2021, in connection with Indian Application No. 201941031238, 6 pages.

Supplementary European Search Report dated Jul. 5, 2022 in connection with European Patent Application No. 20 84 7125, 13 pages.

* cited by examiner

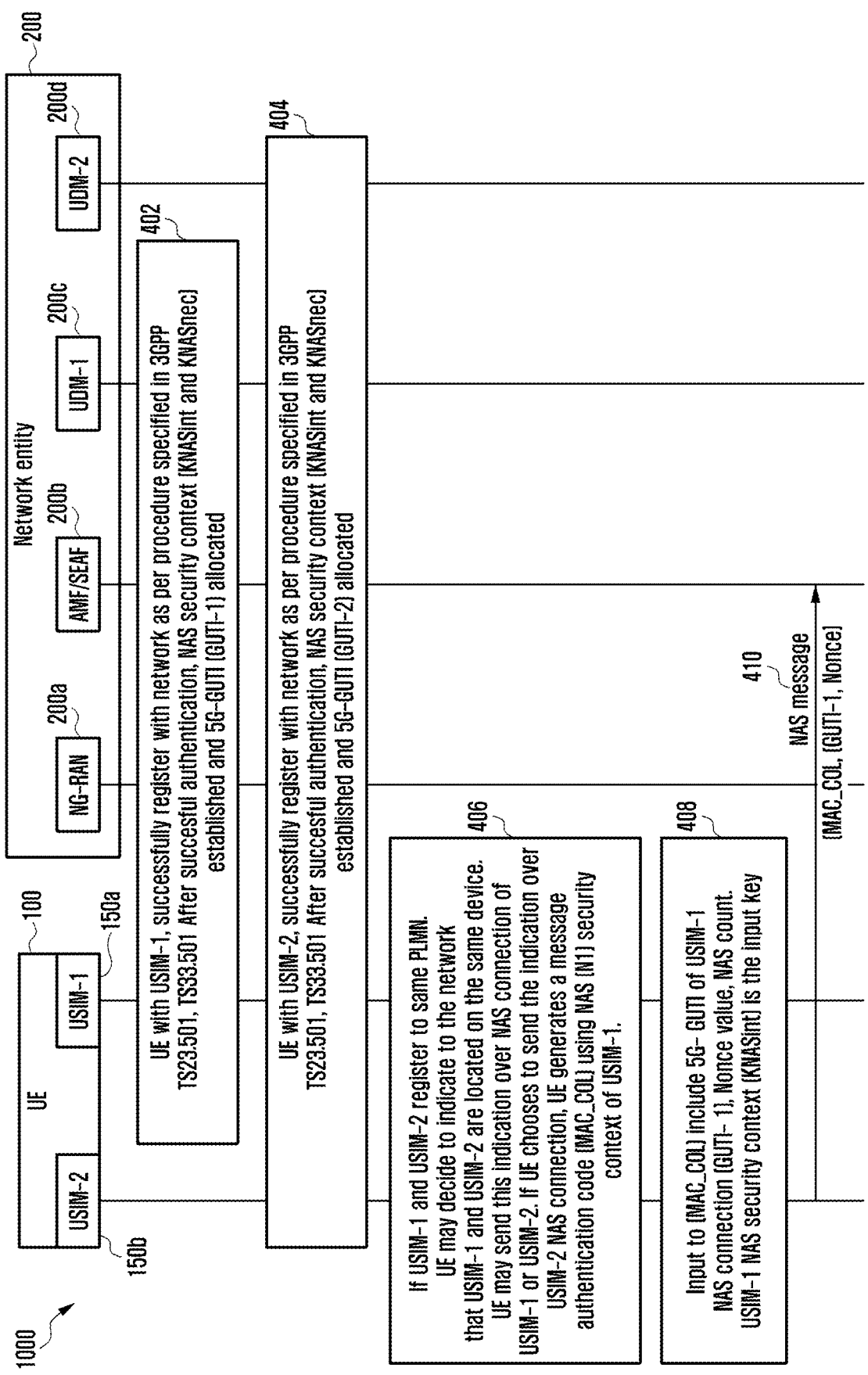

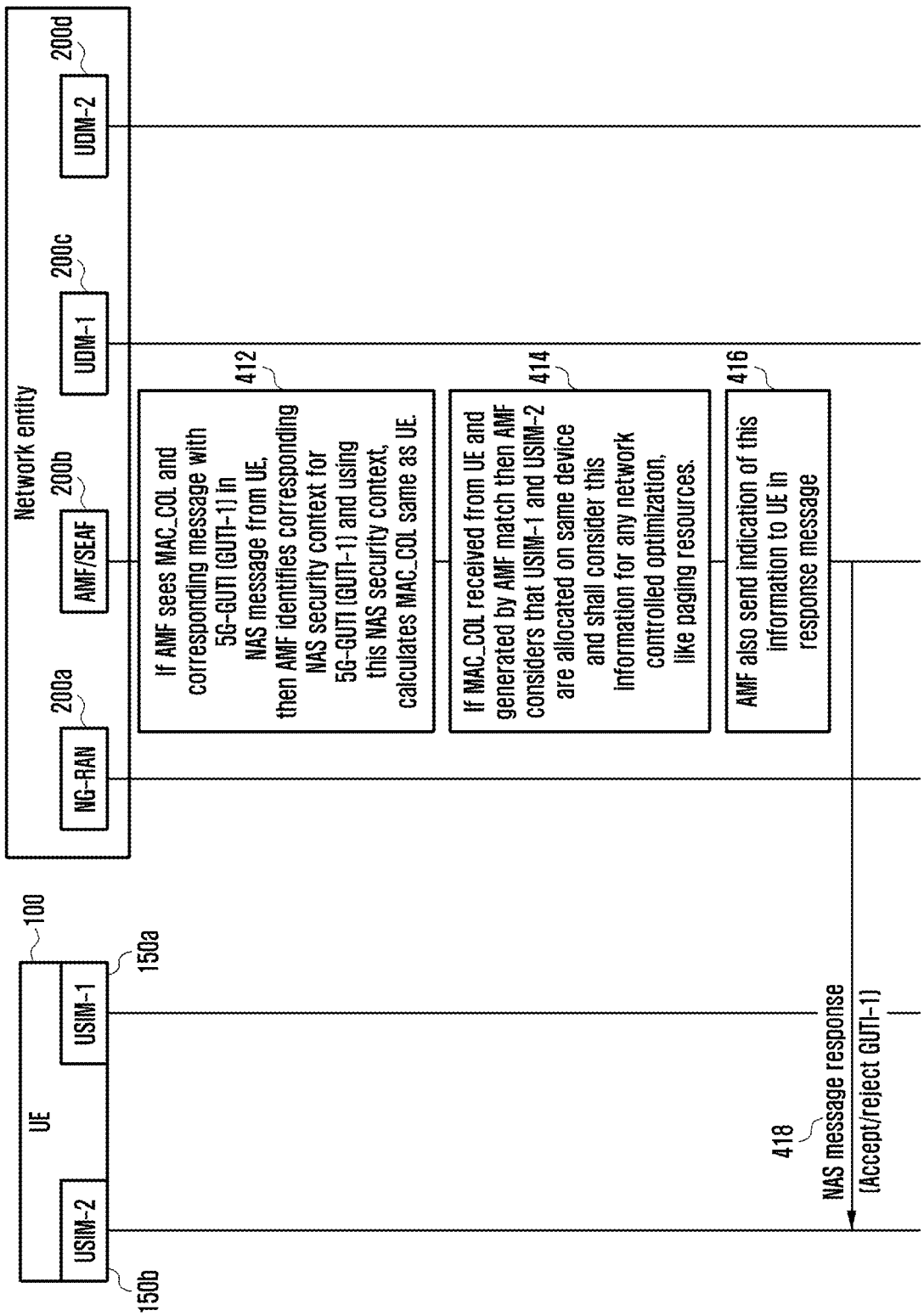

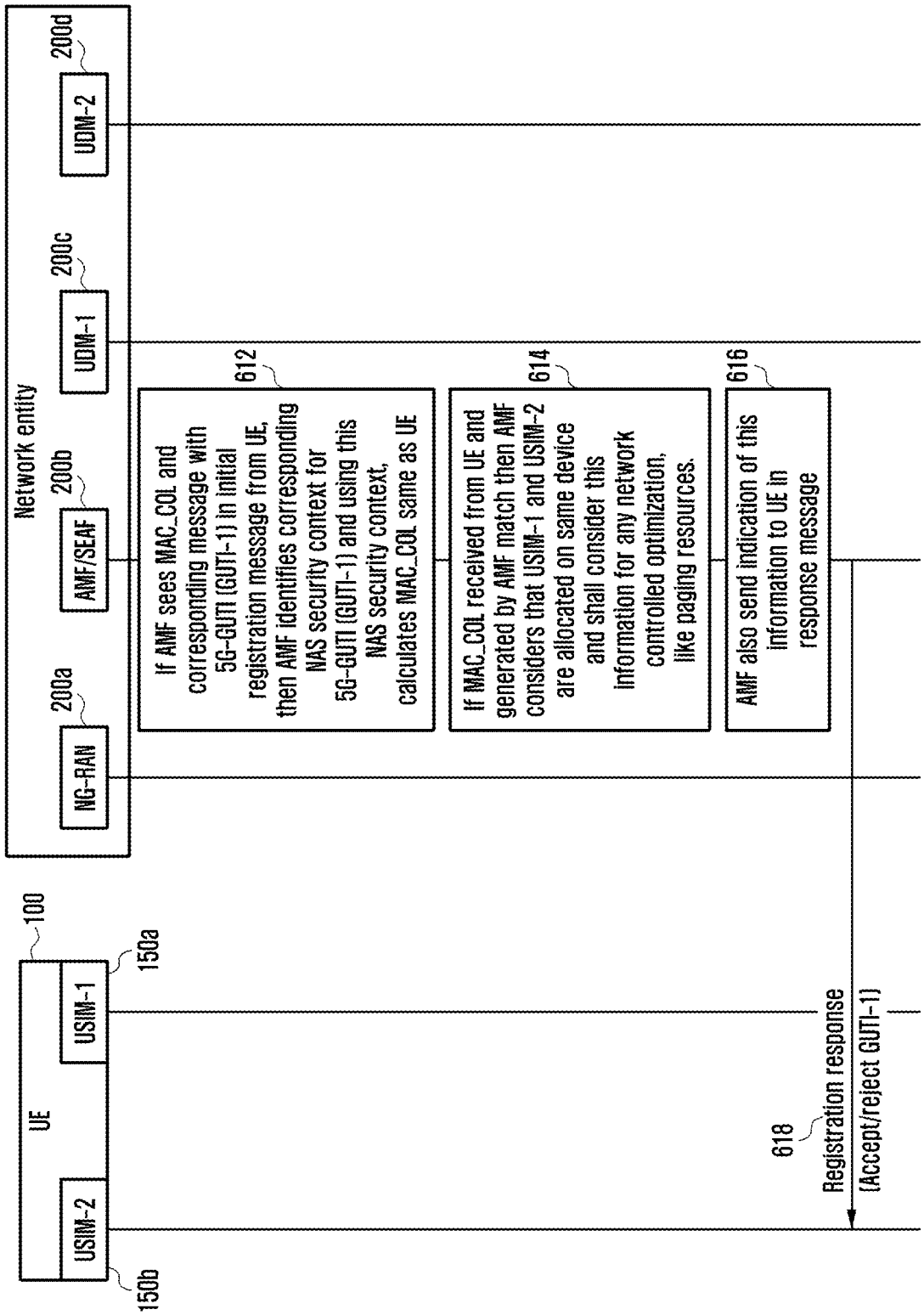

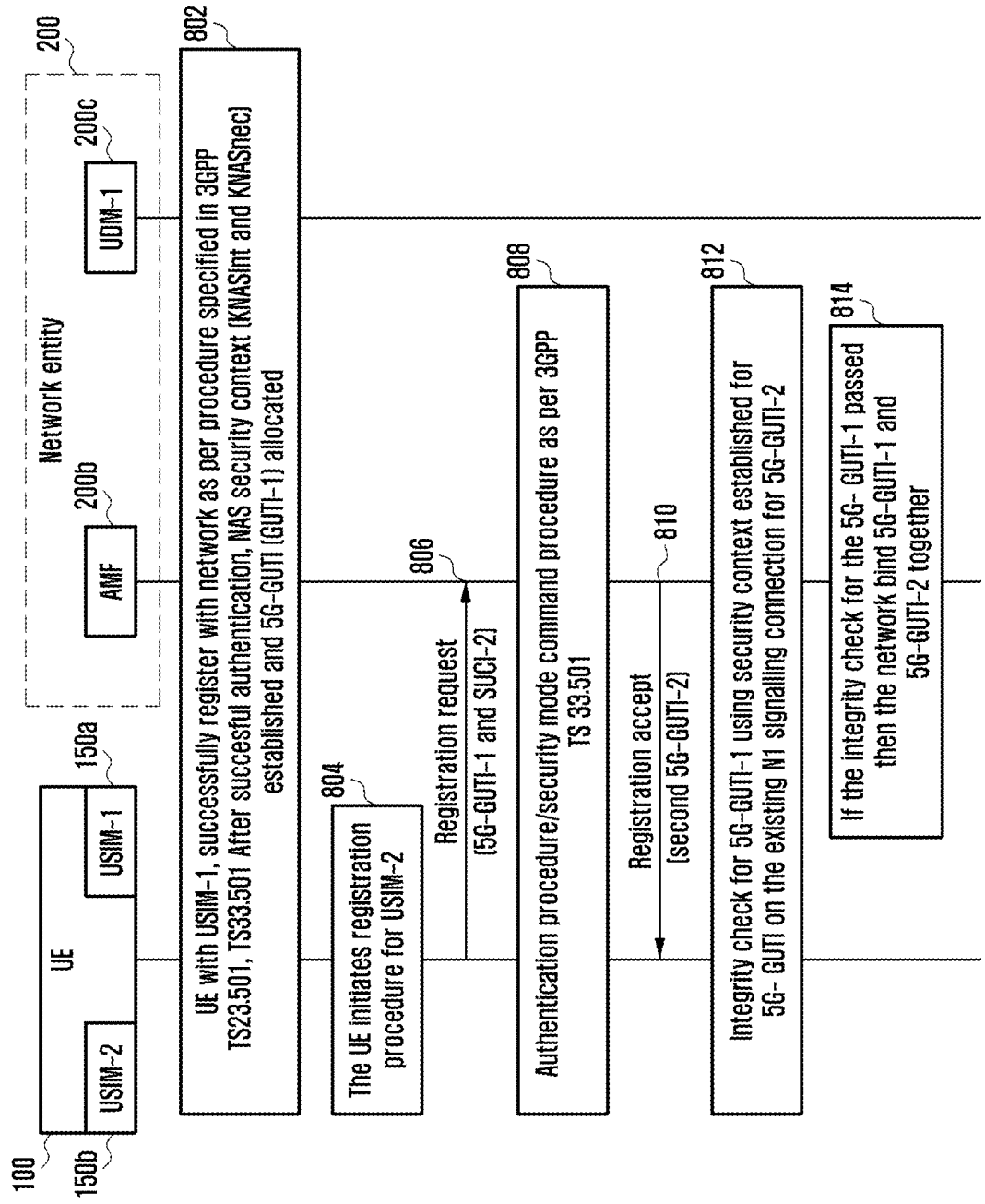

METHOD AND APPARATUS FOR BINDING A PLURALITY OF SUBSCRIBER IDENTITY MODULES (SIMS) ASSOCIATED WITH A USER EQUIPMENT (UE) TO OPTIMIZE NETWORK RESOURCES

CROSS-REFERENCE TO RELATED APPLICATIONS

This application is a 371 National Stage of International Application No. PCT/KR2020/010143, filed Jul. 31, 2020, which claims priority to Indian Patent Application No. 201941031238, filed Aug. 1, 2019, and Indian Patent Application No. 201941031238, filed Jul. 27, 2020, the disclosures of which are herein incorporated by reference in their entirety.

BACKGROUND

1. Field

The present disclosure relates to wireless communication, and more specifically related to a method and apparatus for binding a plurality of subscriber identity modules (SIMS) associated with a user equipment (UE) to optimize network resources in a wireless network.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

According to a 3rd Generation Partnership Project (3GPP) (TR 23.761) system enablers for devices (i.e. user equipment (UE)) with multiple Universal Subscriber Identity Modules (USIMs) have no mechanism to identify that multiple USIMs belongs to same UE (e.g. USIM-1 and USIM-2 belongs to UE-1) or different UEs (e.g. USIM-1 belongs to UE-1 and USIM-2 belongs to UE-2).

Furthermore, in order to optimize a network, this is essential that a serving network is aware of the USIM-1 and the USIM-2 belonging to the same UE. The network optimization such as, i) A paging mechanism intended for the USIM-1 while the UE is actively communicating with the USIM-2.
ii) A mechanism for suspension (or release) and resumption of a continuous connection in the 3GPP system associated with the USIM-1, so that the UE can temporarily leave to the 3GPP system associated with the USIM-2, and then return to the 3GPP system associated with the USIM-1, in a network-controlled manner.
iii) A mechanism for avoiding paging collisions occurring between the USIM-1 and the USIM-2 in the UE.

Furthermore, in the existing 3GPP system, there is no mechanism to identify that USIM-1 and USIM-2 belong to the same or different network operators. Furthermore, the serving network needs to verify that the multiple USIMs belong to the same UE. Lack of such verification may lead to wrong binding of USIMs to the same UE by the serving network for multiple USIMs optimizations. Such wrong binding, where one of the UE (USIM) is a rogue UE, to genuine UEs, for multiple USIMs optimizations, is a security vulnerability and an attacker (rogue UE) can exploit this vulnerability to engage in various attacks on genuine UEs, such as a denial-of-service (DoS) attack. Furthermore, the binding of USIMs to the same UE may also result in a loss of service to either of the USIMs, if any optimizations are considered by the service network.

Thus, it is desired to address the above-mentioned disadvantages or other shortcomings or at least provide a useful alternative.

Accordingly, embodiments herein disclose a method performed by a user equipment (UE) for binding a plurality of subscriber identity modules (SIMs) associated with the UE in a wireless network, the method includes registering a first SIM from the plurality of SIMs with a network entity, registering a second SIM from the plurality of SIMS with the network entity, receiving a non-access stratum (NAS) security context and a temporary identifier associated with the first SIM from the network entity over a NAS connection of the first SIM in response to the successful registration of the first SIM with the network entity, receiving a NAS security context and a temporary identifier associated with the second SIM from the network entity over a NAS connection of the second SIM in response to the successful registration of the second SIM with the network entity, determining that the first SIM and the second SIM are registered on same public land mobile network (PLMN) of the wireless network, and transmitting a message through one of the NAS connection of the first SIM and the NAS connection of the second SIM, wherein the message indicates that the first SIM and the second SIM are located on the same UE.

Further, the method includes determining whether the message is transmitted over at least one of the NAS connection of the first SIM and the NAS connection of the second SIM, generating a message authentication code using the NAS security context associated with the first SIM in case that the UE transmits the message over the NAS connection of the second SIM and transmits the message authentication code with the NAS security context associated with the first SIM, generating the message authentication code using the NAS security context associated with the second SIM in case that the UE transmits the message over the NAS connection of the first SIM and transmits the message authentication code with the NAS security context associated with the second SIM.

Further, the method includes transmitting, by the first SIM of the UE, the message over the NAS connection of the first SIM, wherein the message comprises the temporary identifier associated with the second SIM, and transmitting, by the second SIM of the UE, the message over the NAS connection of the second SIM, wherein the message comprises the temporary identifier associated with the first SIM.

Further, the method includes receiving, by the first SIM of the UE, a request message from the network entity, wherein the request message comprises the temporary identifier associated with the second SIM, determining, by the first SIM of the UE, whether the temporary identifier associated with the second SIM received by the network entity matches the allocated temporary identifier associated with the second SIM during the registration, transmitting, by the first SIM of the UE, a verification success message to the network entity in response to determining that the temporary identifier associated with the second SIM received by the network entity matches the allocated temporary identifier associated with the second SIM during the registration, and transmitting, by the first SIM of the UE, a verification failure message to the network entity in response to determining that the temporary identifier associated with the second SIM received by the network entity does not match the allocated temporary identifier associated with the second SIM during the registration, and Further, the method includes receiving, by the second SIM of the UE, a request message from the network entity, wherein the request message comprises the temporary identifier associated with the first SIM, determining, by the second SIM of the UE, whether the temporary identifier associated with the first SIM received by the network entity matches the allocated temporary identifier associated with the first SIM during the registration, transmitting, by the second SIM of the UE, a verification success message to the network entity in response to determining that the temporary identifier associated with the first SIM received by the network entity matches the allocated temporary identifier associated with the first SIM during the registration, and transmitting, by the second SIM of the UE, a verification failure message to the network entity in response to determining that the temporary identifier associated with the first SIM received by the network entity does not match the allocated temporary identifier associated with the first SIM during the registration.

Accordingly, embodiments herein disclose a method performed by a network entity for binding a plurality of subscriber identity modules (SIMS) associated with the UE in a wireless network, the method includes transmitting a non-access stratum (NAS) security context and a temporary identifier associated with the first SIM of a user equipment (UE) over a NAS connection of the first SIM in response to a successful registration of the first SIM with the network entity, transmitting a NAS security context and a temporary identifier associated with the second SIM of the UE over a NAS connection of the second SIM in response to a successful registration of the second SIM with the network entity, receiving a message over the at least one of the NAS connection of the first SIM of a user equipment (UE) and the NAS connection of the second SIM of the UE, generating a message authentication code corresponding to the NAS security context, determining whether the UE generated message authentication code matches the message authentication code generated by the network entity, transmitting an accept message to the UE and pairing the first SIM with the second SIM in the wireless network in response to determining that the UE generated message authentication code matches the message authentication code generated by the network entity, wherein the accept message indicates that the first SIM and the second SIM are located on the same UE, and transmitting a reject message to the UE in response to determining that the UE generated message authentication code does not match the message authentication code generated by the network entity.

Further, the method includes transmitting an accept message to the UE and pairing the first SIM with the second SIM in the wireless network in response to receiving a verification success message, wherein the accept message indicates that the first SIM and the second SIM are located on the same UE, and transmitting a reject message to the UE in response to receiving a verification failure message.

Further, the method includes transmitting an accept message to the UE and pairing the first SIM with the second SIM in the wireless network in response to receiving a verification success message, wherein the accept message indicates that the first SIM and the second SIM are located on the same UE, and transmitting a reject message to the UE in response to receiving a verification failure message.

Accordingly, the embodiments herein provide a user equipment (UE) for binding a plurality of subscriber identity modules (SIMS) in a wireless network, the UE includes a transceiver and a controller configured to register a first SIM from the plurality of SIMs with a network entity, register a second SIM from the plurality of SIMS with the network entity, receive a non-access stratum (NAS) security context and a temporary identifier associated with the first SIM from the network entity over a NAS connection of the first SIM in response to the successful registration of the first SIM with the network entity, receive a NAS security context and a temporary identifier associated with the second SIM from the network entity over a NAS connection of the second SIM in response to the successful registration of the second SIM with the network entity, determine that the first SIM and the second SIM are registered on same public land mobile network (PLMN) of the wireless network, and transmit a message through one of the NAS connection of the first SIM and the NAS connection of the second SIM, wherein the message indicates that the first SIM and the second SIM are located on the same UE.

Further, the controller is configured to determine whether the message is transmitted over at least one of the NAS connection of the first SIM and the NAS connection of the second SIM, generate a message authentication code using the NAS security context associated with the first SIM in case that the UE transmits the message over the NAS connection of the second SIM and transmits the message authentication code with the NAS security context associated with the first SIM, and generate the message authentication code using the NAS security context associated with the second SIM in case that the UE transmits the message over the NAS connection of the first SIM and transmits the message authentication code with the NAS security context associated with the second SIM.

Further, the controller is configured to transmit, by the first SIM of the UE, the message over the NAS connection of the first SIM, wherein the message comprises the temporary identifier associated with the second SIM, and transmit, by the second SIM of the UE, the message over the NAS connection of the second SIM wherein the message comprises the temporary identifier associated with the first SIM.

Further, the transceiver is configured to receive, by the first SIM of the UE, a request message from the network entity, wherein the request message comprises the temporary identifier associated with the second SIM, determine, by the first SIM of the UE, whether the temporary identifier associated with the second SIM received by the network entity matches the allocated temporary identifier associated with the second SIM during the registration, transmit, by the first SIM of the UE, a verification success message to the network entity in response to determining that the temporary identifier associated with the second SIM received by the network entity matches the allocated temporary identifier associated with the second SIM during the registration, and transmit, by the first SIM of the UE, a verification failure message to the network entity in response to determining that the temporary identifier associated with the second SIM received by the network entity does not match the allocated temporary identifier associated with the second SIM during the registration.

Further, the controller is configured to receive, by the second SIM of the UE, a request message from the network entity, wherein the request message comprises the temporary identifier associated with the first SIM, determine, by the second SIM of the UE, whether the temporary identifier associated with the first SIM received by the network entity matches the allocated temporary identifier associated with the first SIM during the registration, transmit, by the second SIM of the UE, a verification success message to the network entity in response to determining that the temporary identifier associated with the first SIM received by the network entity matches the allocated temporary identifier associated with the first SIM during the registration, and transmit, by the second SIM of the UE, a verification failure message to the network entity in response to determining that the temporary identifier associated with the first SIM received by the network entity does not match the allocated temporary identifier associated with the first SIM during the registration.

Accordingly, the embodiments herein provide a network entity for binding a plurality of subscriber identity modules (SIMS) in a wireless network, the network entity includes a transceiver and a controller configured to transmit a non-access stratum (NAS) security context and a temporary identifier associated with the first SIM of a user equipment (UE) over a NAS connection of the first SIM in response to a successful registration of the first SIM with the network entity, transmit a NAS security context and a temporary identifier associated with the second SIM of the UE over a NAS connection of the second SIM in response to a successful registration of the second SIM with the network entity, receive a message over the at least one of the NAS connection of the first SIM of a user equipment (UE) and the NAS connection of the second SIM of the UE, generate a message authentication code corresponding to the NAS security context, determine whether the UE generated message authentication code matches the message authentication code generated by the network entity, transmit an accept message to the UE and pairing the first SIM with the second SIM in the wireless network in response to determining that the UE generated message authentication code matches the message authentication code generated by the network entity, wherein the accept message indicates that the first SIM and the second SIM are located on the same UE, and transmit a reject message to the UE in response to determining that the UE generated message authentication code does not match the message authentication code generated by the network entity.

Further, the controller is configured to transmit an accept message to the UE and pairing the first SIM with the second SIM in the wireless network in response to receiving a verification success message, wherein the accept message indicates that the first SIM and the second SIM are located on the same UE, and transmit a reject message to the UE in response to receiving a verification failure message.

Further, the controller is configured to transmit an accept message to the UE and pairing the first SIM with the second SIM in the wireless network in response to receiving a verification success message, wherein the accept message indicates that the first SIM and the second SIM are located on the same UE, and transmit a reject message to the UE in response to receiving a verification failure message.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The principal object of the embodiments herein is to provide a method and apparatus for binding a plurality of universal subscriber identity modules (USIMs) associated with a user equipment (UE) to optimize network resources in a wireless network.

Another object of the embodiment herein is to verify that the multiple active USIMs belong to the same UE by a serving network/network entity. The multiple active USIMs means, which have a valid subscription to obtain services from the serving network.

Another object of the embodiment herein to select the same Public Land Mobile Network (PLMN) to get registered to the serving network and to obtain services, then the serving network verifies that multiple SIMs are hosted on the same UE and considers the information for applying network-controlled multiple SIMs optimizations.

Another object of embodiments herein consider dual USIMs into consideration to illustrate the solution alternatives. The solution alternatives are also applicable for multiple SIM scenarios (two or more USIMs).

Another object of the embodiment herein is to configure SIM pairing with another SIM by a home operator for multi-SIM optimizations that are acceptable or not. Similarly, the serving network decides whether the pairing of SIMs for multi-SIM optimizations is acceptable or not. When the UE decides the SIMs to consider for multi-SIM optimizations, the UE requests for pairing for only decided USIMs to the serving network.

Another object of the embodiment herein is to perform multi-SIM optimizations by taking a user's consent and sharing details related to multi-SIM optimizations with the serving network.

Another object of the embodiment herein is to remove the binding/pairing of the multiple SIM by the serving network based on UE's request.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which:

FIG. 4A to FIG. 4B illustrate an example sequential flow diagram illustrating that the network entity performing a verification procedure to determine whether a first SIM and a second SIM are associated with the same UE or different UEs based on an indication message received from the UE, according to an embodiment as disclosed herein;

FIG. 6A to FIG. 6B illustrate an example sequential flow diagram illustrating that the network entity performing a verification procedure to determine whether the first SIM and the second SIM are associated with the same UE or different UEs during a registration procedure, according to an embodiment as disclosed herein;

FIG. 8 illustrates an example sequential flow diagram illustrating that the network entity performing a verification procedure to determine whether the first SIM and the second SIM are associated with the same UE or different UEs based on successful authentication the first SIM over an N1 signalling connection of the second SIM, according to an embodiment as disclosed herein.

DETAILED DESCRIPTION

Figure 1:
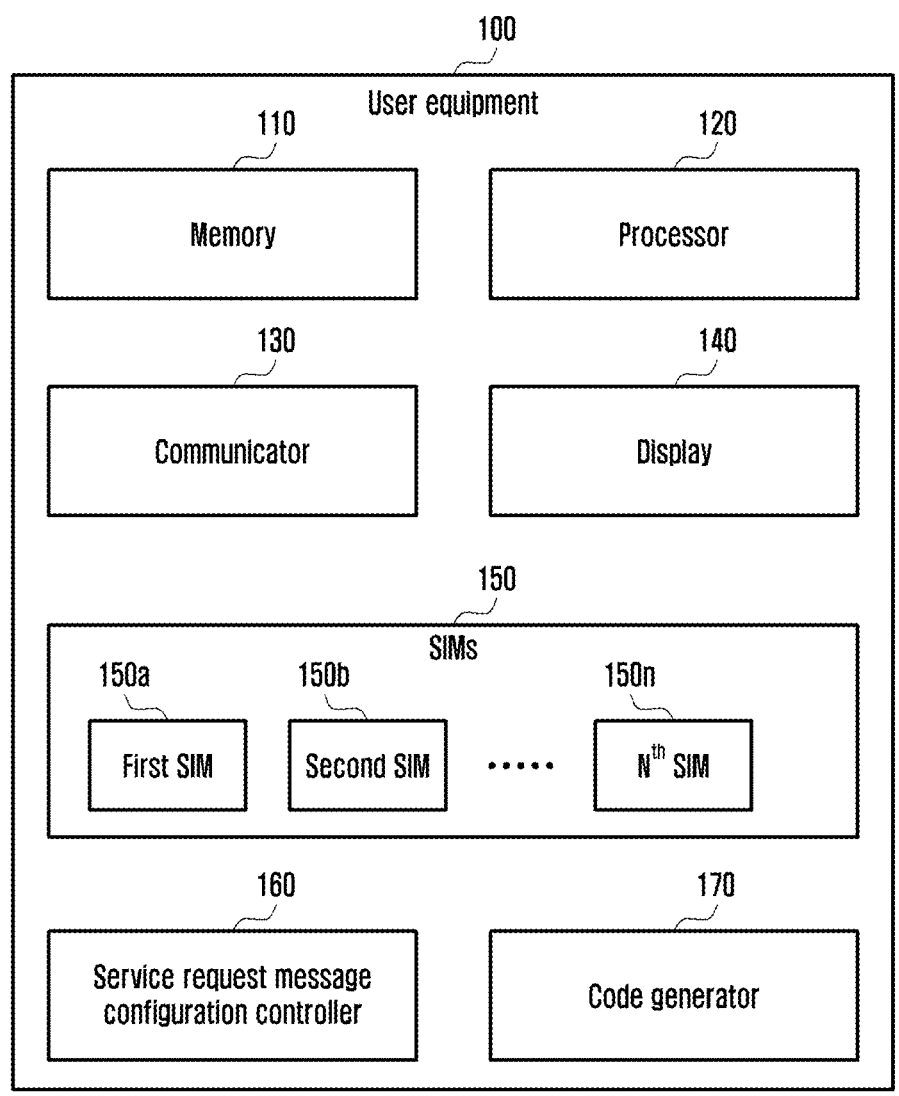
FIG. 1 illustrates a block diagram of a user equipment (UE) for binding a plurality of subscriber identity modules (SIMs) associated with the UE to optimize network resources in a wireless network, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The terms "paring" and "binding" mean the same and used interchangeably throughout this document. The terms "belong" and "hosted" mean the same and used interchangeably throughout this document. The terms "first SIM" and "USIM-1" mean the same and used interchangeably throughout this document. The terms "second SIM" and "USIM-2" mean the same and used interchangeably throughout this document. The term SIM and USIM mean the same and used interchangeably throughout the document.

Accordingly, the embodiments herein provide a method for binding a plurality of subscriber identity modules (SIMs) associated with a user equipment (UE) to optimize network resources in a wireless network. The method includes registering multiple SIMs with a network entity in the wireless network, receiving Non-access stratum (NAS) security contexts and temporary identifiers associated with the multiple SIMS from the network entity over NAS connections of the multiple SIMs. Further, the method includes determining a Public Land Mobile Network (PLMN) associated with the registered multiple SIMs, generating a message authentication code using the NAS security contexts associated with the multiple SIMs, sending a message over the NAS connections of the multiple SIMS. Further, the method includes verifying, by the network entity, the message and paring multiple SIM based on the verification result.

Referring now to the drawings, and more particularly to FIGS. 1 through 8, there are shown preferred embodiments.

FIG. 1 illustrates a block diagram of a user equipment (UE) (100) for binding a plurality of subscriber identity modules (SIMS) (150) associated with the UE (100) to optimize network resources in a wireless network, according to the embodiments as disclosed herein. In an embodiment, the UE (100) includes a memory (110), a processor (120), a communicator (130), a display (140), SIMS (150), a service request message configuration controller (160), and a code generator (170).

The memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). In an embodiment, the memory (110) can be an internal storage unit or it can be an external storage unit of the electronic device 100, a cloud storage, or any other type of external storage.

The processor (120) communicates with the memory (110), the communicator (130), the display (140), the SIM (150), the service request message configuration controller (160), and the code generator (170). The processor (120) is configured to execute instructions stored in the memory (110) and to perform various processes. The communicator (130) is configured for communicating internally between internal hardware components and with external devices via one or more networks.

In an embodiment, the service request message configuration controller (160) registers a first SIM (150a) from the plurality of SIMS (150) with the network entity (200) in the wireless network. Further, the service request message configuration controller (160) registers a second SIM (150b) from the plurality of SIMS (150) with the network entity (200) in the wireless network. Further, the service request message configuration controller (160) receives a Non-access stratum (NAS) security context and a temporary identifier (i.e. 5G GUTI-1) associated with the first SIM (150a) from the network entity (200) over a NAS connection of the first SIM (150a) in response to the successful registration of the first SIM (150a) with the network entity (200). Further, the service request message configuration controller (160) receives a NAS security context and a temporary identifier (i.e. 5G GUTI-2) associated with the second SIM (150b) from the network entity (200) over a NAS connection of the second SIM (150b) in response to the successful registration of the second SIM (150b) with the network entity (200).

Further, the service request message configuration controller (160) determines whether a message sends over at least one of the NAS connection of the first SIM (150a) and the NAS connection of the second SIM (150b). The message indicates that the first SIM (150a) and the second SIM (150b) are located on the same UE (100).

Further, the code generator (170) generates the message authentication code using the NAS security context associated with the first SIM (150a) when the UE (100) sends the message over the NAS connection of the second SIM (150b). Further, the service request message configuration controller (160) sends the message authentication code with the NAS security context associated with the first SIM (150a)

Further, the code generator (170) generates the message authentication code using the NAS security context associated with the second SIM (150b) when the UE (100) sends the message over the NAS connection of the first SIM (150a). Further, the service request message configuration controller (160) sends the message authentication code with the NAS security context associated with the second SIM (150b).

Further, the service request message configuration controller (160) receives a request message from the network entity (200). The request message comprises the temporary identifier of the at least one of the first SIM (150a), and the second SIM (150b). Further, the service request message configuration controller (160) determines whether the temporary identifier received by the UE (100) matches with the temporary identifier received during the registration procedure. Further, the service request message configuration controller (160) sends a verification success message to the network entity (200) in response to determining that the temporary identifier received by the UE (100) matches with the temporary identifier received during the registration procedure. Further, the service request message configuration controller (160) sends a verification failure message to the network entity in response to determining that the temporary identifier received by the network entity (200) does not match with the temporary identifier received during the registration procedure.

Further, the service request message configuration controller (160) selects the first SIM (150a) selected PLMN for the second SIM (150b), if the first SIM (150a) selected PLMN is listed in the preferred PLMN list of secondary PLMN. Further, the service request message configuration controller (160) selects the PLMN if the PLMN is listed in the preferred PLMN list of both SIMs (150a and 150b). Further, the service request message configuration controller (160) selects the PLMN if Home Public Land Mobile Network (HPLMN) of any one of the SIMs (150a or 150b)

and selects the same PLMN for other SIMs (150) also if HPLMN of other SIMS (150) are not available.

Although the FIG. 1 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function to bind the plurality of SIMs (150) associated with the UE (100) to optimize network resources in the wireless network.

Figure 2:
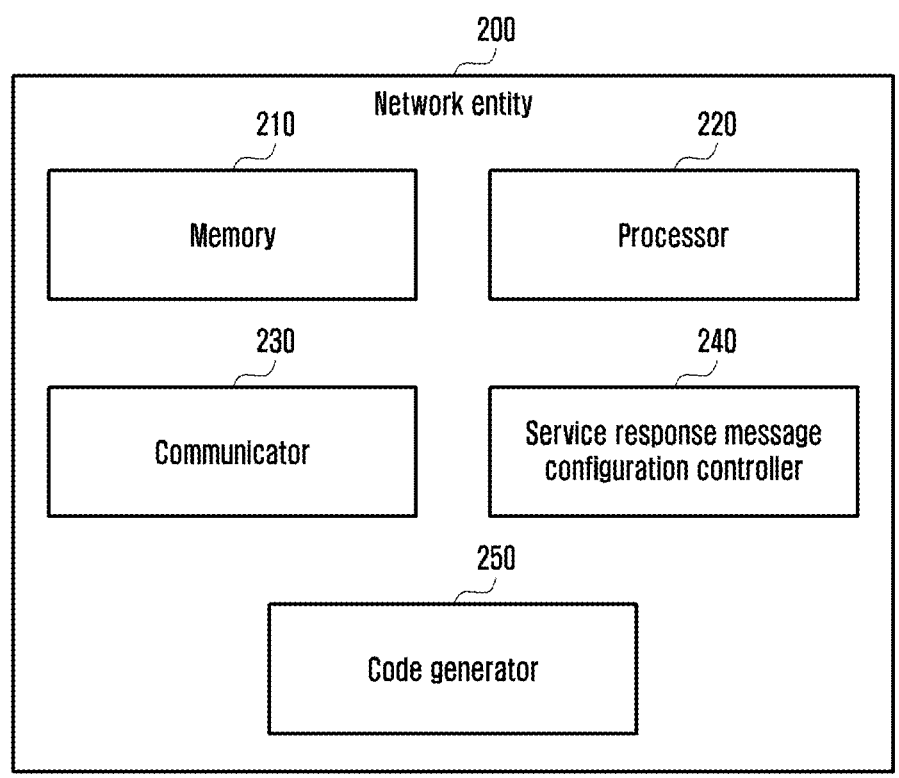
FIG. 2 illustrates a block diagram of a network entity for binding the plurality of SIMs associated with the UE to optimize network resources in the wireless network, according to the embodiments as disclosed herein.

FIG. 2 illustrates a block diagram of the network entity (200) for binding the plurality of SIMs (150) associated with the UE (100) to optimize network resources in the wireless network, according to the embodiments as disclosed herein. In an embodiment, the network entity (200) includes a memory (210), a processor (220), a communicator (230), a service response message configuration controller (240), and a code generator (250). In an embodiment, the network entity (200) comprises a Next-Generation Radio Access Network (NG-RAN) (200a), an Access and Mobility Management Function (AMF)/Security Anchor Function (SEAF) (200b), a Unified Data Management (UDM)-1 (200c), and a UDM-2 (200d) (not shown in the FIG. 2).

The memory (210) also stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in Random Access Memory (RAM) or cache). In an embodiment, the memory (210) can be an internal storage unit or it can be an external storage unit of the electronic device 100, a cloud storage, or any other type of external storage.

The processor (220) communicates with the memory (210), the communicator (230), the service response message configuration controller (240), and the code generator (250). The processor (220) is configured to execute instructions stored in the memory (210) and to perform various processes. The communicator (230) is configured for communicating internally between internal hardware components and with external devices via one or more networks.

In an embodiment, the service response message configuration controller (240) allocates the NAS security context and the temporary identifier associated with the first SIM (150a) to the first SIM (150a) over the NAS connection of the first SIM (150a). Further, the service response message configuration controller (240) allocates the NAS security context and the temporary identifier associated with the second SIM (150b) to the second SIM (150b) over the NAS connection of the second SIM (150b). Further, the service response message configuration controller (240) receives the message over the at least one of the NAS connection of the first SIM (150a) and the NAS connection of the second SIM (150b).

The code generator (250) generates a message authentication code corresponding to the received NAS security context. Further, the service response message configuration controller (240) determines whether the UE (100) generated message authentication code is matched with the message authentication code generated by the code generator (250).

Further, the service response message configuration controller (240) sends an accept message to the UE (100) in response to determining that the UE (100) generated message authentication code is matches with the message authentication code generated by the code generator (250), the accept message indicates that the first SIM (150a) and the second SIM (150b) are located on the same UE (100). Further, the service response message configuration controller (240) pairs the first SIM (150a) with the second SIM (150b) to optimize network resources in the wireless network Further, the service response message configuration controller (240) sends a reject message to the UE (100) in response to determining that the UE (100) generated message authentication code does not match with the message authentication code generated by the code generator (250), the reject message indicates that the first SIM (150a) and the second SIM (150b) are not located on the same UE (100).

Further, the service response message configuration controller (240) receives the verification success message from the UE (100) in response to determining that the temporary identifier sends by the network entity (200) matches with the temporary identifier received during the registration procedure. Further, the service response message configuration controller (240) sends an accept message to the UE (100) and pairing the first SIM (150a) with the second SIM (150b) to optimize network resources in the wireless network in response to receiving the verification success message.

Further, the service response message configuration controller (240) receives the verification failure message from the UE (100) in response to determining that the temporary identifier sends by the network entity (200) does not match with the temporary identifier received during the registration procedure. Further, the service response message configuration controller (240) sends a reject message to the UE (100) in response to receiving the verification failure message.

Further, the service response message configuration controller (240) receives device Identification from a home network. Such device identification information received for authentication of multiple SIMs (150) may be used by serving network's AMF (200b) to identify SIMS (150a and 150b) belonging to the same UE (100) and use such information for multi-SIM optimizations. Further, the service response message configuration controller (240) performs multi USIM optimizations based on an intent indication from the UE (100). Further, the service response message configuration controller (240) identifies SIMS (150a and 150b) belonging to the same UE (100) without any intent indication received from the UE (100). Further, the service response message configuration controller (240) obtains IMEIs/PEIs belonging to the same UE (100) and maps the SUPIs associated with the IMEIs of the UE (100) for multi-SIM optimizations.

Although the FIG. 2 shows various hardware components of the network entity (200) but it is to be understood that other embodiments are not limited thereon. In other embodiments, the network entity (200) may include less or more number of components. Further, the labels or names of the components are used only for illustrative purpose and does not limit the scope of the invention. One or more components can be combined together to perform same or substantially similar function to bind the plurality of SIMs (150) associated with the UE (100) to optimize network resources in the wireless network.

Figure 3A:
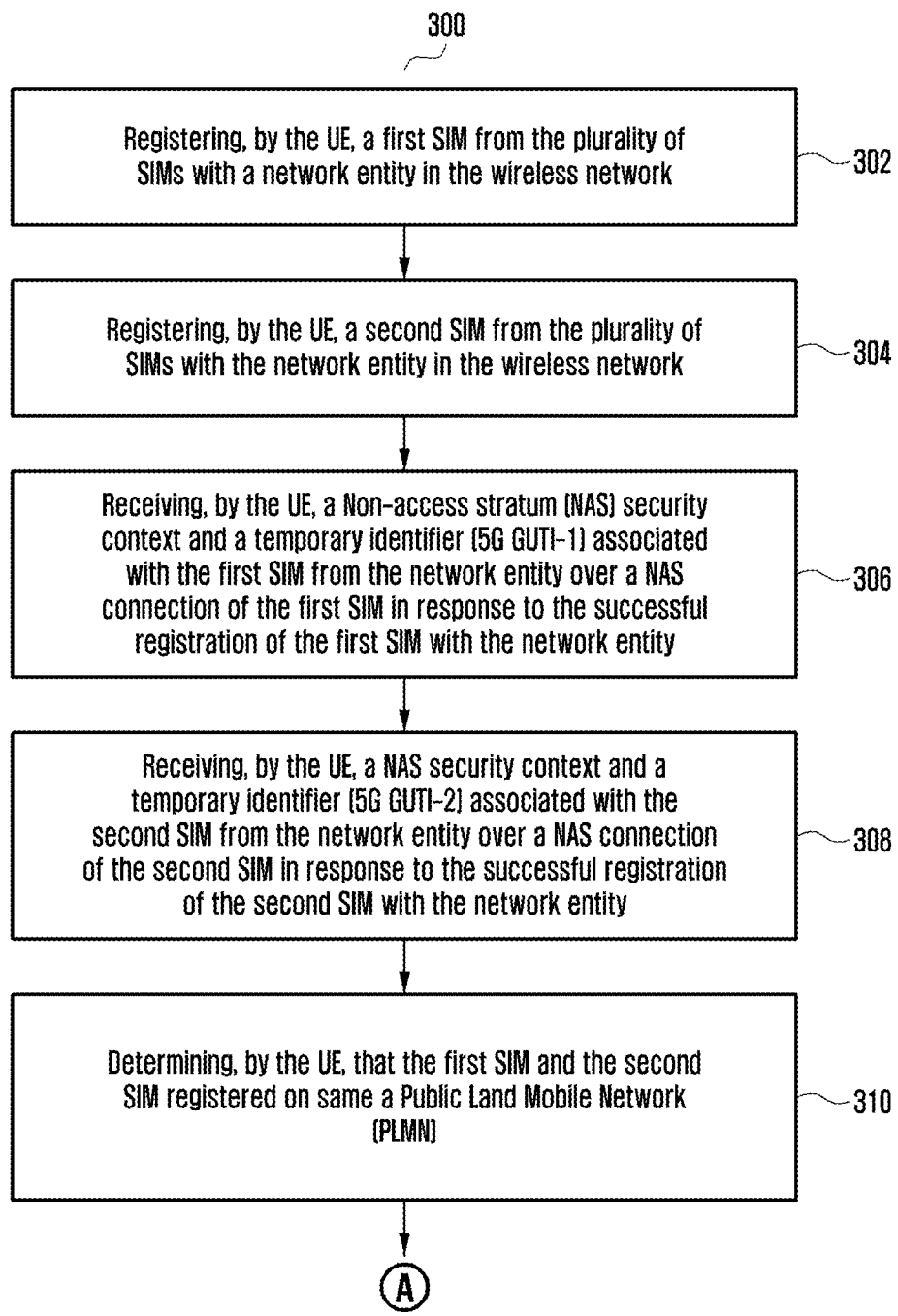
FIG. 3A to FIG. 3C illustrate a flow diagram illustrating various operations for binding the plurality of SIMs associated with the UE to optimize network resources in the wireless network, according to the embodiments as disclosed herein.
Figure 3B:
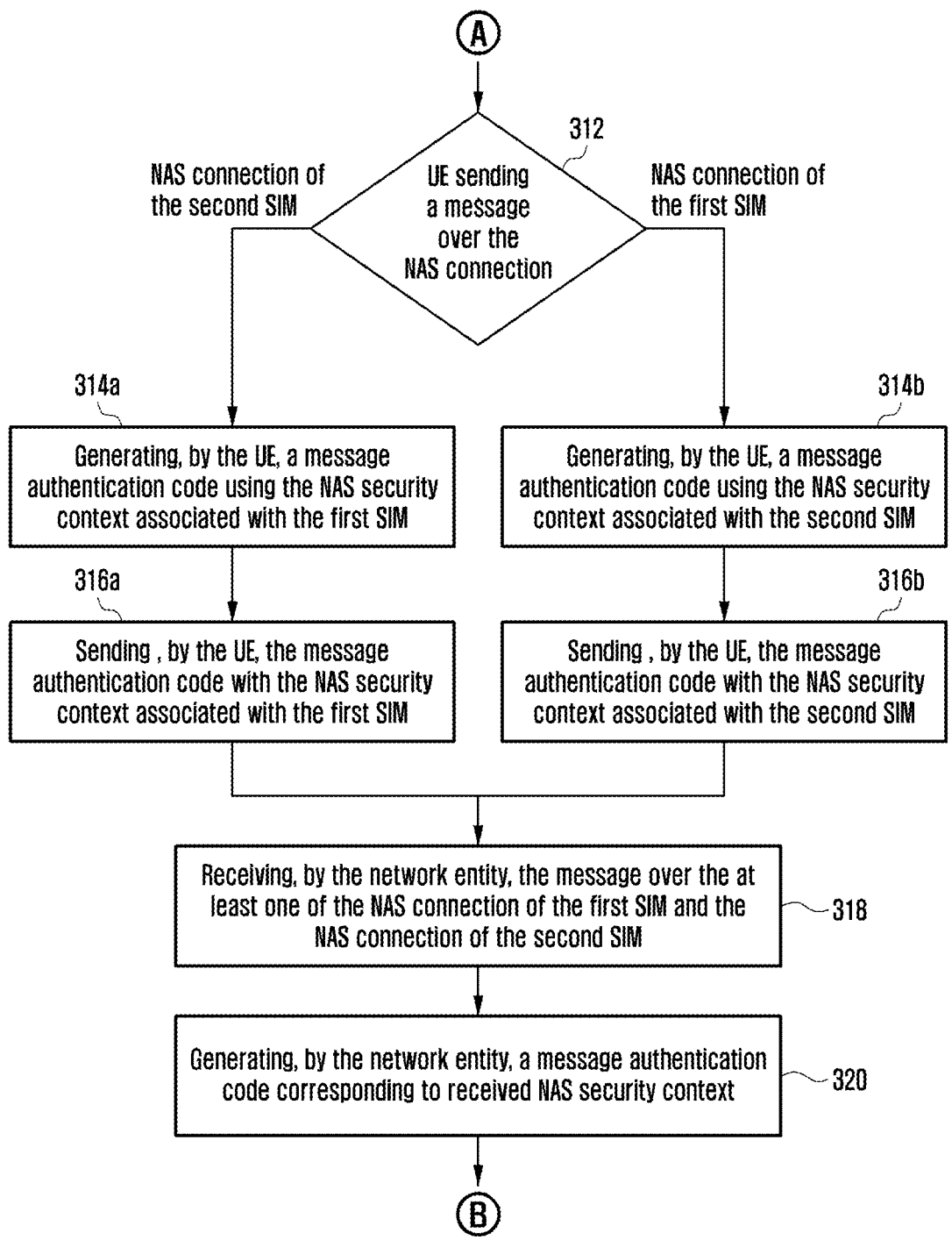
Figure 3C:
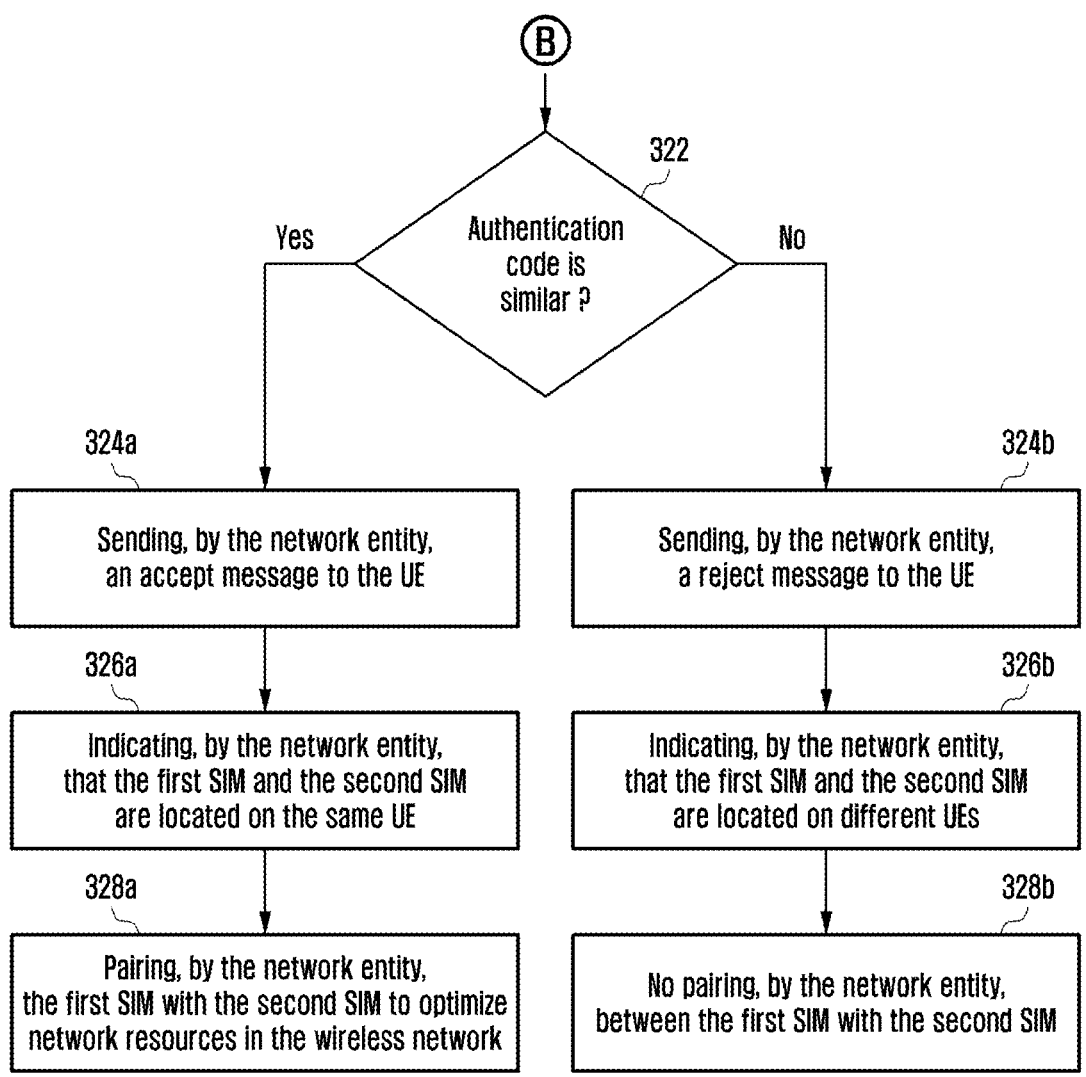

FIG. 3A to FIG. 3C illustrate a flow diagram (300) illustrating various operations for binding the plurality of SIMs (150) associated with the UE (100) to optimize network resources in the wireless network, according to the embodiments as disclosed herein.

At 302, the method includes registering, by the UE (100), the first SIM (150a) from the plurality of SIMs (150) with the network entity (200) in the wireless network. At 304, the method includes registering, by the UE (100), the second SIM (150b) from the plurality of SIMs (150) with the network entity (200) in the wireless network. At 306, the method includes receiving, by the UE (100), the NAS security context and the temporary identifier (i.e. 5G GUTI-1) associated with the first SIM (150a) from the network entity (200) over the NAS connection of the first SIM (150a) in response to the successful registration of the first SIM (150a) with the network entity (200).

At 308, the method includes receiving, by the UE (100), the NAS security context and the temporary identifier (i.e. 5G GUTI-2) associated with the second SIM (150b) from the network entity (200) over the NAS connection of the second SIM (150b) in response to the successful registration of the second SIM (150b) with the network entity (200). At 310, the method includes determining, by the UE (100), that the first SIM (150a) and the second SIM (150b) are registered on same the PLMN. At 312, the method includes sending a message through one of the NAS connection of the first SIM (150a) and the NAS connection of the second SIM (150b), determining that the message sends over at least one of the NAS connection of the first SIM (150a) and the NAS connection of the second SIM (150b). The message indicates that the first SIM (150a) and the second SIM (150b) are located on the same UE (100).

At 314a, the method includes generating, by the UE (100), the message authentication code using the NAS security context associated with the first SIM (150a) when the UE (100) sending the message over the NAS connection of the second SIM (150b). At 316a, the method includes sending, by the UE (100), the message authentication code with the NAS security context associated with the first SIM (150a). At 314b, the method includes generating, by the UE (100), the message authentication code using the NAS security context associated with the second SIM (150b) when the UE (100) sending the message over the NAS connection of the first SIM (150a). At 316b, the method includes sending, by the UE (100), the message authentication code with the NAS security associated with the second SIM (150b).

At 318, the method includes receiving, by the network entity (200), the message over the at least one of the NAS connection of the first SIM (150a) and the NAS connection of the second SIM (150b). At 320, the method includes generating, by the network entity (200), the message authentication code corresponding to the received NAS security context. At 322, the method includes determining, by the network entity (200), whether the UE (100) generated message authentication code matches the message authentication code generated by the network entity (200).

At 324a, the method includes sending, by the network entity, the accept message to the UE (100) in response to determining that the UE (100) generated message authentication code matches the message authentication code generated by the network entity (200). At 326a, the method includes indicating, by the network entity (200), that the first SIM (150a) and the second SIM (150b) are located on the same UE (100). At 328a, the method includes pairing, by the network entity, the first SIM (150a) with the second SIM (150b) to optimize network resources in the wireless network. At 324b, the method includes sending, by the network entity (200), the reject message to the UE (100) in response to determining that the UE (100) generated message authentication code does not match the message authentication code generated by the network entity (200). At 326b, indicating, by the network entity (200), that the first SIM (150a) and the second SIM (150b) are located on different UEs. At 328b, no pairing, by the network entity (200), between the first SIM (150a) with the second SIM (150b).

FIG. 4A to FIG. 4B illustrate an example sequential flow diagram illustrating that the network entity (200) performing a verification procedure to determine whether the first SIM (150a) and the second SIM (150b) are associated with the same UE (100) or different UEs based on an indication message received from the UE (100), according to an embodiment as disclosed herein.

At 402-404, the UE (100) registers to the network entity (200) for the first SIM (150a) (i.e. USIM-1) and the second SIM (150b) (i.e. USIM-2) independently as per procedures specified in 3GPP TS 23.501 and TS 33.501. After successful registration to the network entity (200), NAS security context is established and a temporary identifier (i.e. 5G GUTI) assigned to the UE (100) for the USIM-1 (150a) and the USIM-2 (150b) independently by the network entity (200) (i.e. serving network).

At 406-408, when the USIM-1 (150a) and the USIM-2 (150b) register to the same network (PLMN) independently, then the UE (200) may decide to indicate to the network entity (200) that USIM-1 (150a) (GUTI-1) and USIM-2 (150b) (GUTI 2) are located on the same UE (200) and ready for any multi-SIM optimizations from the network entity (200). The UE (200) may send the indication to the network entity (200) over the NAS connection belonging to the USIM-1 (150a) or the USIM-2 (150b). If the UE (100) chooses to send the indication over USIM-2 (150b) NAS connection, then the UE (200) generates a message authentication code (MAC_col) using NAS (N1) security context of USIM-1 (150a). Further information on the authentication code of the message is given in the FIG. 5.

At 410, the UE (100) sends the MAC_col and indication message (5G GUTI of USIM-1 (150a) (GUTI 1), Random number Nonce) to the network entity (200) by one of a New NAS message, a Registration Request message, a Registration Accept ACK message and a NAS Security Mode Command (SMC) complete message. At 412, the AMF (200b) receives the MAC_COL and corresponding message with 5G-GUTI (GUTI-1) in the NAS message from the UE (100), then the AMF (200b) identifies corresponding NAS security context for 5G-GUTI (GUTI-1) and using the NAS security context, calculates MAC_COL same as the UE (100).

At 414, if MAC_COL received from the UE (100) and generated by the AMF (200b) match then the AMF (200b) considers that the USIM-1 (150a) and the USIM-2 (150b) are allocated on the same UE (100) and shall consider this information for any network controlled optimization, like paging resources. At 416-418, the AMF (200b) also send the indication of this information to the UE (100) in a response message (e.g. accept message, reject message). Further, the network entity (200)'s AMF (200b) may perform one of not send the result of verification to the UE (100), send the result of verification to the UE (100) in one of a New NAS message, a Registration Accept message, a NAS SMC message.

Figure 5:
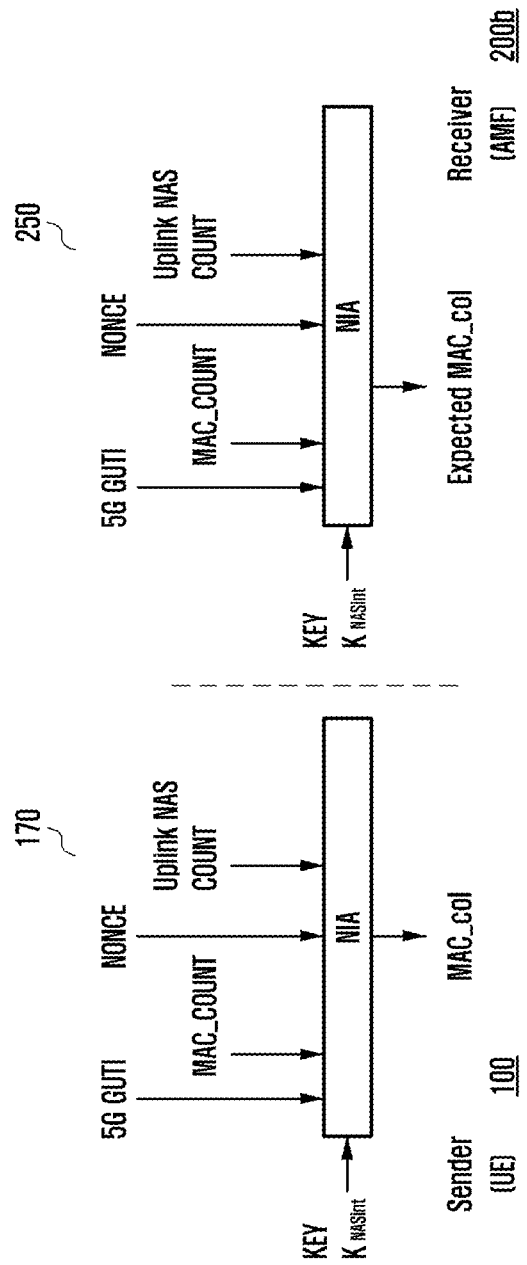
FIG. 5 illustrates an authentication code generator to verify whether the first SIM and the second SIM are associated with the same UE or different UEs, according to an embodiment as disclosed herein.

FIG. 5 illustrates an authentication code generator (170 and 250) to verify whether the first SIM (150a) and the second SIM (150b) are associated with the same UE (100) or different UEs, according to an embodiment as disclosed herein.

Example of the authentication code generator (170 & 250) when the UE (100) chooses to send the indication over the USIM-2 (150b) NAS connection. The input for the code generator (170) are KEY (KNASint corresponding to USIM-1 (150a)'s NAS security context), 5G GUTI of USIM-1 (150a) (GUTI-1), random value nonce, MAC_count, and uplink NAS Count of NAS COUNT pair corresponding to USIM-1 (150a)'s NAS security context.

MAC_COUNT is a counter used for calculation of MAC_col and is incremented by the UE (100) after every MAC_col calculation and by the AMF (200b) after MAC_col verification. The start value of MAC_COUNT is issued to the UE (100) by the AMF (200b) after a successful registration procedure of the UE (100) with the network entity (200). The UE (100) increments the uplink NAS Count value after MAC_col calculation.

The UE (100) sends the MAC_col and the indication message (5G GUTI of USIM-1 (150a) (GUTI 1), Random number Nonce) in the NAS message to the AMF (200b) along with other appropriate information. Upon receipt of such message from the UE (100), if there is a MAC_col and an indication message in initial registration message from the UE (100), then the AMF (200b) takes the message as an indication from USIM-2 (150b) that USIM-2 (150b) is located with another USIM on the UE (100). In such a case, the AMF (200b) verifies the MAC_col. The AMF calculates the MAC_col like the UE (100) by the code generator (250).

Inputs of the code generator (250) are key for MAC_col calculation is identified based on 5G GUTI (GUTI-1) in an indication message from the UE (100). Upon successful verification of MAC_col, the AMF (200b) considers that USIM-1 (150a) (NAS context identifier 5G GUTI) and USIM-2 (150b) (NAS context identifier 5G GUTI) are located on the same UE (100) and uses the information for any network-controlled optimizations for dual SIM. AMF also sends the result of the verification to the UE in the NAS response message. After calculation of MAC_col, serving network's AMF (200b) updates/increments the MAC_COUNT and the uplink NAS Count in NAS COUNT Pair for the UE (100) (USIM-1 (150a)).

In multi-USIM (150) scenario, the UE (100) may send MAC_col and indication message of each USIM (150) in the NAS message to the network entity (200). The AMF (200b) will consider for network controlled optimizations if the verification MAC_col of all USIMs (150) are successful.

Figure 6A:
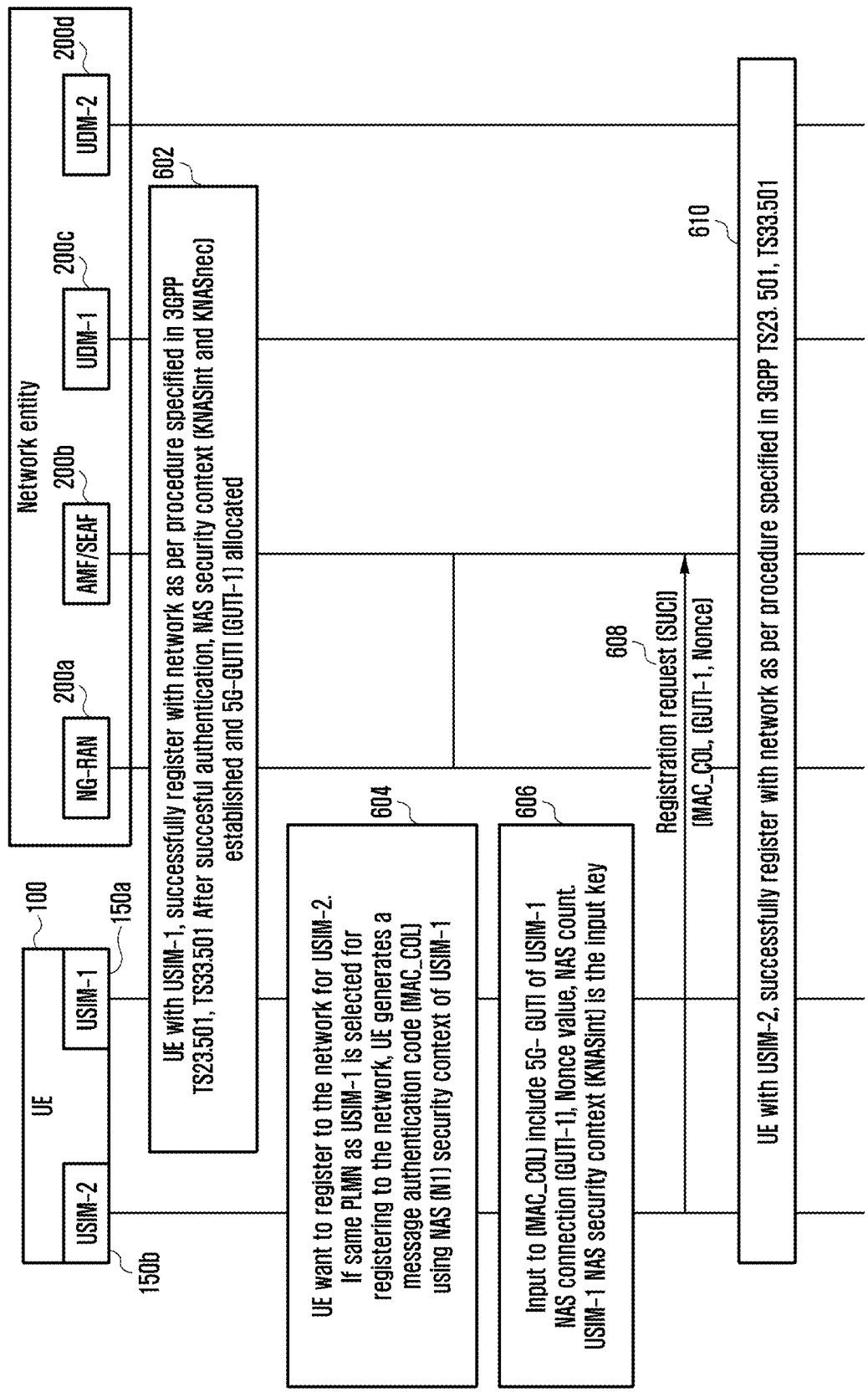

FIG. 6A to FIG. 6B illustrate an example sequential flow diagram illustrating that the network entity (200) performing a verification procedure to determine whether the first SIM (150a) and the second SIM (150b) are associated with the same UE (100) or different UEs during a registration procedure, according to an embodiment as disclosed herein.

At 602, the UE (100) registers to the network entity (200) for the USIM-1 (150a) as per procedures specified in 3GPP TS 23.501 and TS 33.501. After successful registration to the network entity (200), NAS security context is established and a temporary identifier (i.e. 5G GUTI) assigned to the UE (100) for the USIM-1 (150a) by the network entity (200) (i.e. serving network).

At 604, when the UE (100) wants to register to the network entity (200) for the USIM-2 (150b), selects the same PLMN as the USIM-1 (150a) as per PLMN selection policy for the USIM-2 (150b), then the UE (100) generates a message authentication code (MAC_col) by the code generator (170) (Refer FIG. 5). At 606, the inputs to the code generator (170) are KEY (Knasint corresponding to USIM-1 (150a)'s NAS security context), 5G GUTI of USIM-1 (150a) (GUTI-1), random value nonce, MAC_count, and uplink NAS Count of NAS COUNT pair corresponding to USIM-1 (150a)'s NAS security context.

MAC_COUNT is a counter used for calculation of MAC_col and is incremented by the UE (100) after every MAC_col calculation and by the AMF (200b) after MAC_col verification. The start value of MAC_COUNT is issued to the UE (100) by the AMF (200b) after a successful registration procedure of the UE (100) with the network entity (200). The UE (100) increments the uplink NAS Count value after MAC_col calculation.

At 608, the UE (100) sends the MAC_col and the indication message (5G GUTI of USIM-1 (150a) (GUTI 1), Random number Nonce) in the registration request to the AMF (200b) for the USIM-2 (150b) along with other appropriate information as per 3GPP specification TS 23.501 and TS 33.501. At 610, upon receipt of the registration request from the UE (100), the AMF (200b) proceeds with registration procedure as specified in TS 23.501 and TS 33.501.

At 612, if the MAC_col and an indication message in initial registration message from the UE (100), then the AMF (200b) takes the message as an indication from the USIM-2 (150b) that it is located with another USIM on the same UE (100). At 614, in such a case, after successful primary authentication of the UE (100) for the USIM-2 (150b) and before Registration accept message to the UE (100), the AMF (200b) verifies the MAC_col. The AMF (200b) calculates the MAC_col like the UE (100) (Refer FIG. 5). The input to the code generator (250) are key for MAC_col calculation is identified based on 5G GUTI (GUTI 1) in an indication message from the UE (100).

At 616, upon successful verification of the MAC_col, the AMF (200b) considers that USIM-1 (150a) (NAS context identifier 5G GUTI) and USIM-2 (150b) (NAS context identifier 5G GUTI) are located on the same UE (100) and uses the information for any network-controlled optimizations for multi-SIM. At 618, the AMF (200b) also sends the result of the verification to the UE (100) in the registration response message. After calculation of MAC_col, the AMF (200b) updates/increments the MAC_COUNT and the uplink NAS Count in NAS COUNT Pair for the UE (100) (USIM-1 (150a)).

In multi-USIM (150) scenario, the UE (100) may send MAC_col and indication message of each USIM (150) in the registration procedure to the network entity (200). The AMF (200b) will consider for network-controlled optimizations if the verification MAC_col of all USIMs (150) are successful.

Figure 7A:
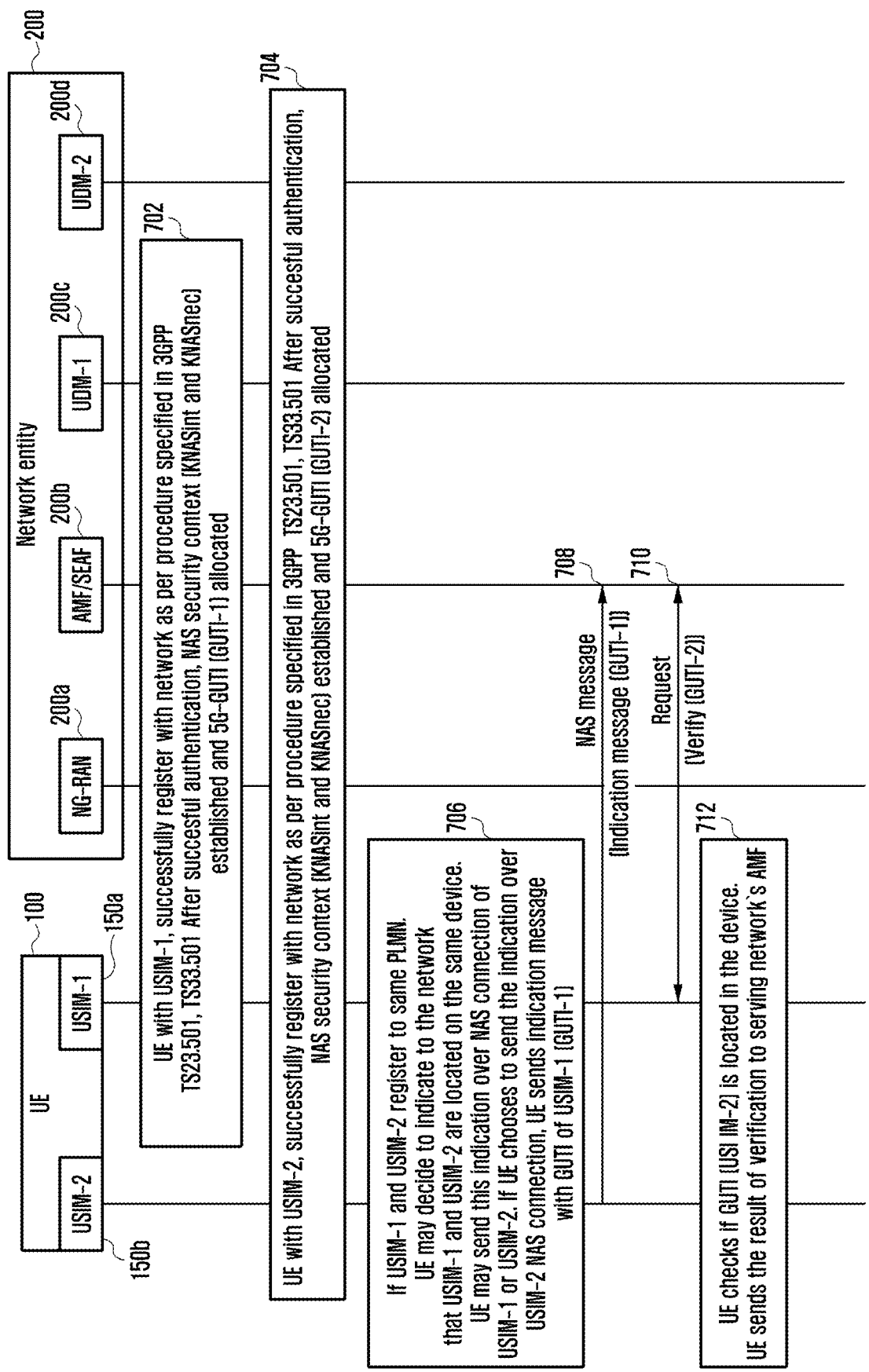
FIG. 7A to FIG. 7B illustrate an example sequential flow diagram illustrating that the network entity performing piggybacks and a verification procedure to determine whether the first SIM and the second SIM are associated with the same UE or different UEs based on an indication message received from the UE, according to an embodiment as disclosed herein.
Figure 7B:
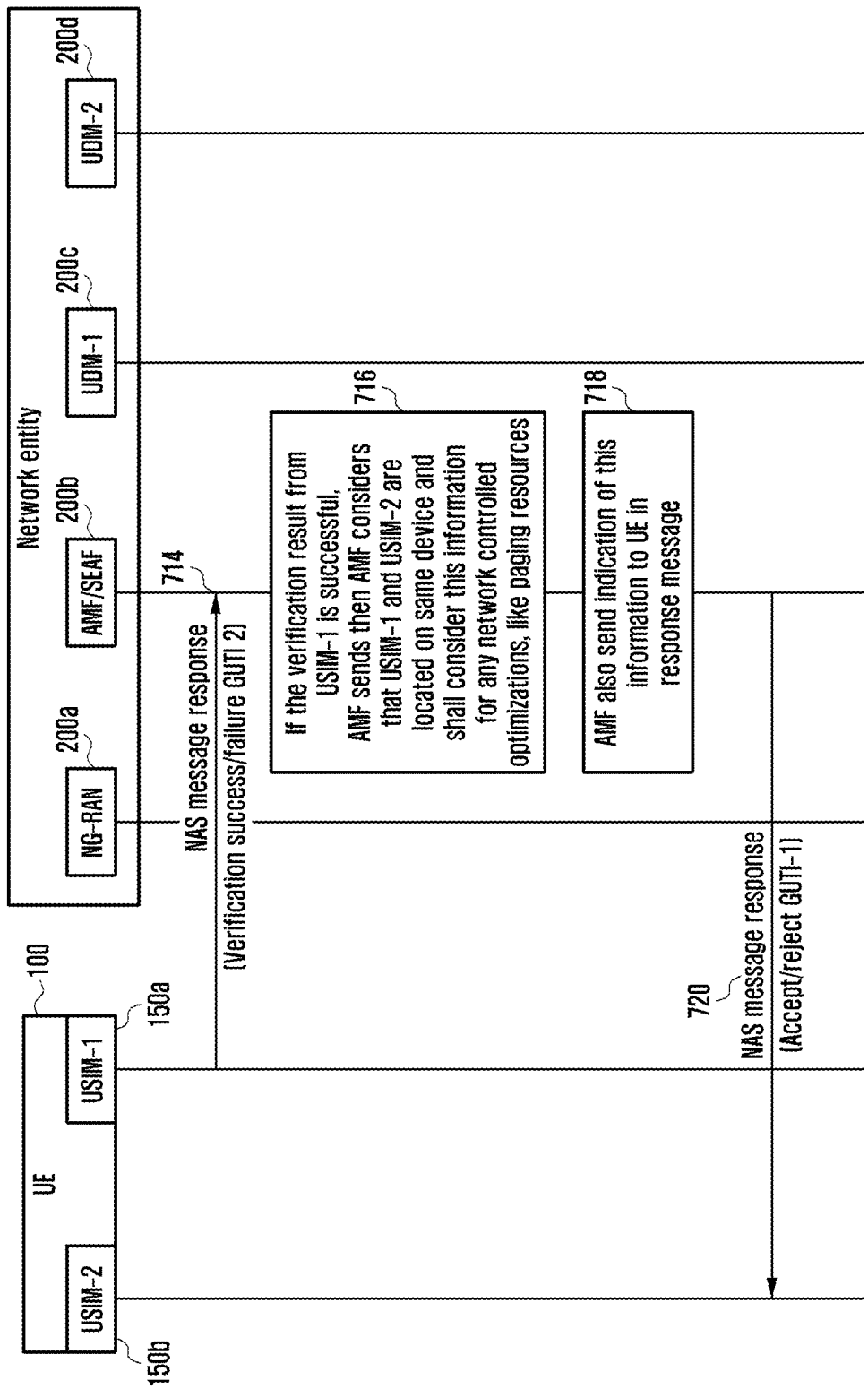

FIG. 7A to FIG. 7B illustrate an example sequential flow diagram illustrating that the network entity (200) performing piggybacks and a verification procedure to determine whether the first SIM (150a) and the second SIM (150b) are associated with the same UE (100) or different UEs based on an indication message received from the UE (100), according to an embodiment as disclosed herein.

At 702-704, the UE (100) registers to the network entity (200) for the USIM-1 (150*a*) and the USIM-2 (150*b*) independently as per procedures specified in 3GPP TS 23.501 and TS 33.501. After successful registration to the network entity (200), NAS security context is established and a temporary identifier (i.e. 5G GUTI) assigned to the UE (100) for the USIM-1 (150*a*) and the USIM-2 (150*b*) independently by the network entity (200) (i.e. serving network).

At 706, when the USIM-1 (150*a*) and the USIM-2 (150*b*) are camped to the same network (PLMN), then the UE (100) may decide to indicate to the network that USIM-1 (150*a*) (GUTI 1) and USIM-2 (150*b*) (GUTI 2) are located on the same UE (100) and ready for any multi-SIM optimizations from the network. At 708, the UE (100) may send an indication to the network entity (200) over NAS connection belonging to the USIM-1 (150*a*) or the USIM-2 (150*b*).

At 710, upon receipt of such an indication message from the UE (100), the AMF (200*b*) takes the message as an indication from USIM-2 (150*b*) that it is located with another USIM on the same UE (100). In such a case, the AMF (200*b*) sends a verification request to the USIM-1 (150*a*) (GUTI 1) over the USIM-1's NAS connection for verification for USIM-2 (150*b*) (GUTI 2). At 712-714, upon such a request from the AMF (200*b*), the UE (100) checks if the USIM-1 (150*a*) and the USIM-2 (150*b*) are located on the same UE (100), and responds to the AMF (200*b*) with the verification result.

At 716-718, upon on receipt of successful confirmation from the UE (100) (USIM-1 (150*a*) NAS connection), the AMF (200*b*) considers that USIM-1 (150*a*) (NAS context identifier 5G GUTI) and the USIM-2 (150*b*) (NAS context identifier 5G GUTI) are located on the same UE (100) and uses this information for any network controlled optimizations for multi-SIM (150). At 720, the AMF (200*b*) also sends the result of the verification to the UE (100) (USIM-2 (150*b*)) in the NAS response message.

In multi-USIM (150) scenario, the UE (100) may send 5G GUTI of each USIM (150) in the indication message over NAS to the network entity (200). The AMF (200*b*) requests all the USIMs (150) in the indication message, requesting for verification. The AMF (200*b*) will consider for network-controlled optimizations based on successful verification messages from the requested USIMs (150) by the serving network's AMF (200*b*).

FIG. 8 illustrates an example sequential flow diagram illustrating that the network entity (200) performing a verification procedure to determine whether the first SIM (150*a*) and the second SIM (150*b*) are associated with the same UE (100) or different UEs based on successful authentication the first SIM (150*a*) over an N1 signalling connection of the second SIM (150*b*), according to an embodiment as disclosed herein.

At 802, the UE (100) initiates the registration procedure for USIM-1 (150*a*) and the registration procedure is successfully performed. The 5G NAS security context is established for the USIM-1 (150*a*) and 5G-GUTI-1 has been assigned. At 804, the UE (100) is in 5G Mobility Management (5GMM)-IDLE mode for the USIM-1 (150*a*) and initiates registration procedure for the USIM-2 (150*b*). At 806, the UE (100) sends the Registration Request message containing 5G-GUTI-1 and SUCI-2 of the USIM-2 (150*b*). The presence of 5G-GUTI-1 indicates to the network entity (200) to bind the context of the USIM-1 (150*a*) and the USIM-2 (150*b*). Alternatively, the UE (100) sends an explicit binding indication to the network entity (200) to bind the USIM-1 (150*a*) and the USIM-2 (150*b*). The N1-signaling connection is established between the UE (100) and the AMF (200*b*) for the USIM-2 (150*b*).

At 808, the network entity (200) performs an authentication procedure for the USIM-2 (150*b*). The network entity (200) may perform a security mode command procedure for the USIM-2 (150*b*). At 810, after the successful authentication procedure or security mode command procedure, the network entity (200) assigns 5G-GUTI-2 to the USIM-2 (150*b*), and the registration procedure is performed successfully.

At 812, the network entity (200) does not release the N1 signalling connection. The network on the USIM-2 (150*b*) N1 signalling connection performs one of the following steps:

Performs authentication procedure for the USIM-1 (150*a*); Or

The network entity (200) requests to the UE (100) to send integrity protected NAS message using the Security context of the USIM-1 (150*a*). The UE (100) sends a NAS message with integrity protected using the security context of the USIM-1 (150*a*). The NAS message from the UE (100) may contain any information related to the USIM-1 (150*a*)'s NAS context or the NAS message from the UE (100) may not contain any information element. The NAS message from the UE (100) and the Serving network' AMF (200*b*), may be an existing message or a new NAS message. The NAS message from the UE (100) is NAS protected (NAS-MAC) using the USIM-1 (150*a*)'s security context as specified in TS 33.501. The network entity (200) verifies if the integrity protection of the received NAS message using the USIM-1 (150*a*)'s security context is successful or not.

At 814, if the procedure i) or ii) in step 812 has been performed successfully then the network determines that USIM-1 (150*a*) and the USIM-2 (150*b*) are present in the same UE (100). The UE (100) binds the USIM-1 (150*a*) and the USIM-2 (150*b*) (e.g. NAS context of the USIM-1 (150*a*) and the USIM-2 (150*b*)). Further, if the procedure i) or ii) in step 812 fails then the network entity (200) does not bind the USIM-1 (150*a*) and the USIM-2 (150*b*).

In one example, the network entity (200) considers the USIM-2 as fake UE and blacklist USIM-1. In one example, the network sends error cause illegal UE or illegal ME to the UE. The UE on receiving this cause considers the registration procedure fails and does not initiate Registration procedure until the UE is power cycle or a new UICC is inserted in the ME.

In an embodiment, after registration and successful primary authentication, the serving network's AMF (200*b*) may receive the UE (100) s identification from the home network. The identification information received for authentication of multiple USIMs (150) may be used by the serving network's AMF (200*b*) to identify USIMs (150) belonging to the same UE (100) and use such information for multi-SIM optimizations. Additionally, the network (200) may consider multi USIM (150) optimizations based on an intent indication from the UE (100). Further, the network entity (200) itself figure out that both the USIM's (150*a* and 150*b*) belong to the same UE (100) without any information indicating by the UE (100) and provide an indication to the UE (100). Further, the AMF (200*b*) obtains IMEIs/PEIs belonging to the same UE (100) and maps the SUPIs associated with the IMEIs of the UE (100) for multi-SIM optimizations.

In an embodiment, the UE (100) selects the primary SIM (i.e. first SIM (150*a*)) selected PLMN for the secondary SIM (i.e. second SIM (150*b*)), if the primary SIM (150*a*) selected PLMN is listed in the preferred PLMN list of secondary PLMN. Further, the UE (100) selects the PLMN if the PLMN is listed in the preferred PLMN list of both USIMs (150*a* and 150*b*). Further, the UE (100) selects the PLMN, if it is HPLMN of any one of the USIMs and it selects the same PLMN for other USIMs also if HPLMN of other USIMs are not available.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a user equipment (UE) associated with a plurality of subscriber identity modules (SIMs) in a wireless network, the method comprising:
    transmitting, to a network entity, a registration request for a first SIM of the plurality of SIMs and a registration request for a second SIM of the plurality of SIMs;
    receiving a first non-access stratum (NAS) security context and a first temporary identifier associated with the first SIM from the network entity through a first NAS connection of the first SIM in response to transmitting the registration request for the first SIM, and receiving a second NAS security context and a second temporary identifier associated with the second SIM from the network entity through a second NAS connection of the second SIM in response to transmitting the registration request for the second SIM;
    identifying that the first SIM and the second SIM are registered on a same public land mobile network (PLMN) of the wireless network;
    determining one of the first NAS connection or the second NAS connection for transmitting an indication message indicating that the first SIM and the second SIM are located on the UE; and
    based on the determination, transmitting the indication message and a message authentication code for the indication message through one of the first NAS connection and the second NAS connection to the network entity,
    wherein, in case that the indication message is transmitted through the first NAS connection, the indication message includes the second temporary identifier and the message authentication code is generated using the second NAS security context, and
    wherein, in case that the indication message is transmitted through the second NAS connection, the indication message includes the first temporary identifier and the message authentication code is generated using the first NAS security context.

2. The method of claim 1, further comprising:
    receiving, from the network entity, an accept message or a reject message in response to transmitting the indication message and the message authentication code.

3. The method of claim 1, wherein,
    in case that the indication message is transmitted through the first NAS connection, an input of the message authentication code generated by the UE includes an integrity key corresponding to the second NAS security context, the second temporary identifier, a random value nonce, a message authentication code calculation counter, and an uplink NAS count corresponding to the second NAS security context.

4. The method of claim 1, wherein,
    in case that the indication message is transmitted through the second NAS connection, an input of the message authentication code generated by the UE includes an integrity key corresponding to the first NAS security context, the first temporary identifier, a random value nonce, a message authentication code calculation counter, and an uplink NAS count corresponding to the first NAS security context.

5. A method performed by a network entity for binding a plurality of subscriber identity modules (SIMs) associated with a user equipment (UE) in a wireless network, the method comprising:
    receiving, from the UE, a registration request for a first SIM of the plurality of SIMs and a registration request for a second SIM of the plurality of SIMs;
    transmitting a first non-access stratum (NAS) security context and a first temporary identifier associated with the first SIM to the UE through a first NAS connection of the first SIM in response to receiving the registration request for the first SIM, and transmitting a second NAS security context and a second temporary identifier associated with the second SIM to the UE through a second NAS connection of the second SIM in response to receiving the registration request for the second SIM;
    receiving an indication message indicating that the first SIM and the second SIM are located on the UE and a message authentication code generated by the UE for the indication message from the UE through one of the first NAS connection and the second NAS connection;
    generating a message authentication code using one of the first NAS security context and the second NAS security context corresponding to one of the first NAS connection and the second NAS connection through which the indication message is received;
    identifying whether the message authentication code generated by the UE matches the message authentication code generated by the network entity; and
    determining whether the first SIM and the second SIM are located on the UE based on the identification,
    wherein, in case that the indication message is received through the first NAS connection, the indication message includes the second temporary identifier and the message authentication code is generated using the second NAS security context, and
    wherein, in case that the indication message is received through the second NAS connection, the indication message includes the first temporary identifier and the message authentication code is generated using the first NAS security context.

6. The method of claim 5,
    wherein, in case that the indication message is received through the first NAS connection, an input of the message authentication code generated by the network entity includes an integrity key corresponding to the second NAS security context, the second temporary identifier, a random value nonce, a message authentication code calculation counter, and an uplink NAS count corresponding to the second NAS security context.

7. The method of claim 5,
wherein, in case that the indication message is received through the second NAS connection, an input of the message authentication code generated by the network entity includes an integrity key corresponding to the first NAS security context, the first temporary identifier, a random value nonce, a message authentication code calculation counter, and an uplink NAS count corresponding to the first NAS security context.

8. A user equipment (UE) for binding associated with a plurality of subscriber identity modules (SIMs) in a wireless network, the UE comprising:
a transceiver; and
a controller coupled with the transceiver and configured to:
transmit, to a network entity, a registration request for a first SIM of the plurality of SIMs and a registration request for a second SIM of the plurality of SIMs,
receive a first non-access stratum (NAS) security context and a first temporary identifier associated with the first SIM from the network entity through a first NAS connection of the first SIM in response to transmitting the registration request for the first SIM, and receive a second NAS security context and a second temporary identifier associated with the second SIM from the network entity through a second NAS connection of the second SIM in response to transmitting the registration request for the second SIM,
identify that the first SIM and the second SIM are registered on a same public land mobile network (PLMN) of the wireless network,
determine one of the first NAS connection or the second NAS connection for transmitting an indication message indicating that the first SIM and the second SIM are located on the UE, and
based on the determination, transmit the indication message and a message authentication code for the indication message through one of the first NAS connection and the second NAS connection to the network entity,
wherein, in case that the indication message is transmitted through the first NAS connection, the indication message includes the second temporary identifier and the message authentication code is generated using the second NAS security context, and
wherein, in case that the indication message is transmitted through the second NAS connection, the indication message includes the first temporary identifier and the message authentication code is generated using the first NAS security context.

9. The UE of claim 8, wherein the controller is further configured to:
receive, from the network entity, an accept message or a reject message in response to transmitting the indication message and the message authentication code.

10. The UE of claim 9, wherein,
in case that the indication message is transmitted through the first NAS connection, an input of the message authentication code generated by the UE includes an integrity key corresponding to the second NAS security context, the second temporary identifier, a random value nonce, a message authentication code calculation counter, and an uplink NAS count corresponding to the second NAS security context.

11. The UE of claim 9, wherein,
in case that the indication message is transmitted through the second NAS connection, an input of the message authentication code generated by the UE includes an integrity key corresponding to the first NAS security context, the first temporary identifier, a random value nonce, a message authentication code calculation counter, and an uplink NAS count corresponding to the first NAS security context.

12. A network entity for binding a plurality of subscriber identity modules (SIMs) associated with a user equipment (UE) in a wireless network, the network entity comprising:
a transceiver; and
a controller coupled with the transceiver and configured to:
receive, from the UE, a registration request for a first SIM of the plurality of SIMs and a registration request for a second SIM of the plurality of SIMs,
transmit a first non-access stratum (NAS) security context and a first temporary identifier associated with the first SIM to the UE through a first NAS connection of the first SIM in response to receiving the registration request for the first SIM, and transmit a second NAS security context and a second temporary identifier associated with the second SIM to the UE through a second NAS connection of the second SIM in response to receiving the registration request for the second SIM,
receive an indication message indicating that the first SIM and the second SIM are located on the UE and a message authentication code generated by the UE for the indication message from the UE through of the first NAS connection and the second NAS connection,
generate a message authentication code using one of the first NAS security context and the second NAS security context corresponding to one of the first NAS connection and the second NAS connection through which the indication message is received,
identify whether the message authentication code generated by the UE matches the message authentication code generated by the network entity, and
determine whether the first SIM and the second SIM are located on the UE based on the identification,
wherein, in case that the indication message is received through the first NAS connection, the indication message includes the second temporary identifier and the message authentication code is generated using the second NAS security context, and
wherein in case that the indication message is received through the second NAS connection, the indication message includes the first temporary identifier and the message authentication code is generated using the first NAS security context.

13. The network entity of claim 12, wherein,
in case that the indication message is received through the second NAS connection, an input of the message authentication code generated by the network entity includes an integrity key corresponding to the first NAS security context, the first temporary identifier, a random value nonce, a message authentication code calculation counter, and an uplink NAS count corresponding to the first NAS security context.

14. The network entity of claim 12, wherein,
in case that the indication message is received through the first NAS connection, an input of the message authentication code generated by the network entity includes an integrity key corresponding to the second NAS security context, the second temporary identifier, a random value nonce, a message authentication code calculation counter, and an uplink NAS count corresponding to the second NAS security context.

* * * * *